(12) United States Patent
Issa

(10) Patent No.: US 9,468,947 B2
(45) Date of Patent: Oct. 18, 2016

(54) EMPTY SEED SHELLS REMOVING APPARATUS

(71) Applicant: Joseph Issa, Montreal (CA)

(72) Inventor: Joseph Issa, Montreal (CA)

( * ) Notice: Subject to any disclaimer, the term of this patent is extended or adjusted under 35 U.S.C. 154(b) by 0 days.

(21) Appl. No.: 14/694,130

(22) Filed: Apr. 23, 2015

(65) Prior Publication Data

US 2015/0306632 A1 Oct. 29, 2015

(30) Foreign Application Priority Data

Apr. 25, 2014 (GB) .................................. 1407359.7

(51) Int. Cl.
*B07B 4/00* (2006.01)
*B07B 4/08* (2006.01)
*A01K 39/012* (2006.01)
*A01K 39/014* (2006.01)

(52) U.S. Cl.
CPC ............... *B07B 4/08* (2013.01); *A01K 39/012* (2013.01); *A01K 39/014* (2013.01)

(58) Field of Classification Search
CPC ..... A01K 39/012; A01K 39/014; B07B 4/08
USPC ........................................................ 209/471
See application file for complete search history.

(56) References Cited

U.S. PATENT DOCUMENTS

| 2,931,500 | A | * | 4/1960 | Ridderstrom | ............. | B07B 4/08 |
| | | | | | | 209/138 |
| 4,384,953 | A | * | 5/1983 | Christian | ................ | B03B 4/065 |
| | | | | | | 209/137 |
| 6,887,290 | B2 | * | 5/2005 | Strauser | ................ | E01H 1/0827 |
| | | | | | | 55/283 |
| 2001/0032806 | A1 | * | 10/2001 | Flores | ...................... | B07B 4/02 |
| | | | | | | 209/138 |

* cited by examiner

Primary Examiner — Terrell Matthews

(57) ABSTRACT

The empty seed shell removing apparatus has a main body including an interior, an interior floor portion, a top portion including air intake openings, a front portion having a front opening, and a front portion having an air exhaust opening. A fan assembly attached within the interior of the main body and including a fan member adapted to create an air stream from the air intake openings, around and through the interior, and out through the air exhaust opening; and a shell container sized and shaped to removably slide and fit within the front opening. The shell container includes a bin section adapted to hold the mixture of full seed shells and empty seed shells, wherein when the shell container is full of the mixture of full seed shells and empty seed shells and placed within the main body the fan member is activated creating the air stream from the air intake openings, around and through the interior, and out through the air exhaust opening, such that the air stream circulates through the mixture of full seed shells and empty seed shells causing the empty seed shells to fly out of the bin section while leaving the full seed shells therein, and wherein the empty seed shells end up upon the interior floor portion ready for removal once the fan member is deactivated.

13 Claims, 4 Drawing Sheets

EMPTY SEED SHELLS REMOVING APPARATUS

This application claims priority based on request GB1407359.7 filed Apr. 25, 2014

FIELD OF THE INVENTION

The present invention relates generally to seed feed but more particularly to an empty seed shells removing apparatus.

BACKGROUND OF THE INVENTION

Feeding birds and other such seed feeding animals is a popular activity. Unfortunately, when the feeders are partially empty and need a refill, there is a lot of empty seed shells left in. It can be a chore to separate the empty shells from the good ones before refilling the feeder. There has to be a better way of doing this.

SUMMARY OF THE INVENTION

In view of the foregoing disadvantages inherent in the known devices now present in the prior art, the present invention, which will be described subsequently in greater detail, is to provide objects and advantages which are:

To provide for an empty seed shells removing apparatus.

In order to do so, the empty seed shell removing apparatus has a main body including an interior, an interior floor portion, a top portion including air intake openings, a front portion having a front opening, and a front portion having an air exhaust opening. A fan assembly attached within the interior of the main body and including a fan member adapted to create an air stream from the air intake openings, around and through the interior, and out through the air exhaust opening; and a shell container sized and shaped to removably slide and fit within the rear opening. The shell container includes a bin section adapted to hold the mixture of full seed shells and empty seed shells, wherein when the shell container is full of the mixture of full seed shells and empty seed shells and placed within the main body the fan member is activated creating the air stream from the air intake openings, around and through the interior, and out through the air exhaust opening, such that the air stream circulates through the mixture of full seed shells and empty seed shells causing the empty seed shells to fly out of the bin section while leaving the full seed shells therein, and wherein the empty seed shells end up upon the interior floor portion ready for removal once the fan member is deactivated.

The fan assembly includes a fan motor casing for holding the fan motor in place within the main body interior and is attached to an interior surface of the top portion. The fan motor casing includes a disc member having a semi-circular shape attached to a bottom portion thereof and adapted to prevent the air stream from circulating over the empty seed shells that have accumulated on the interior floor portion.

The empty seed shell removing apparatus is further comprised of a mesh member placed against an interior surface of the front portion and adapted to cover the air exhaust opening and filter the airflow therethrough to prevent the empty seed shells from escaping out through the air exhaust opening, and a mesh holding frame having a mesh opening with a similar shape to that of the air exhaust opening, such that the mesh holding frame is secured to the interior surface of the front portion and the mesh opening is aligned with the air exhaust opening.

A flip lid adapted to be pivotally connected to the main body and removably cover the front portion and air exhaust opening.

The main body includes a dimple on two respective opposite exterior sides; and the flip lid includes a receiving pin on respective opposite side portions that are adapted to align and connect with each respective dimple of the main body, to thereby provide the pivotal connection between the flip lid and the main body.

An air exhaust clip in louver is adapted to direct the air exhaust opening.

The fan assembly further comprises a direct current motor attached thereto, a battery pack attached to a bottom portion of the main body located under the interior floor portion, and a switch member attached through a rear wall of the bottom portion wherein the battery pack is electrically connected to the switch member which is electrically connected to the direct current motor which is electrically connected to the fan member, such that the fan member can be activated or deactivated by a user controlling the switch member.

The fan assembly further comprises an alternating current motor attached thereto, a switch member attached through a front wall of the bottom portion, and an electric cord adapted to extend between the switch member and an external power source, wherein the switch member is electrically connected to the alternating current motor which is electrically connected to the fan member, such that the fan member can be activated or deactivated by a user controlling the switch member.

Each air intake opening includes a plurality of louvers adapted to help direct the air flow through the air intake openings and into the interior of the main body.

A method of separating and removing empty seed shells from a container having a mixture of full seed shells and empty seed shells, the method comprising the steps of:

a. providing an empty seed shell removing apparatus as set forth in claim 7 on a flat and stable surface;

b. removing the shell container having a mixture of full seed shells and empty seed shells from a given location;

c. placing the shell container and the mixture into a rear opening of the main body;

d. using the switch member to activate the fan member;

e. gently rocking and shaking the apparatus to allow and aid the air stream to circulate within the mixture within the bin section to thereby help separate and remove the empty seed shells from the full seed shells;

f. placing the apparatus back on the flat and stable surface;

g. using the switch member to deactivate the fan member;

h. removing the shell container from the main body and removing and storing the full seed shells;

i. removing all the empty seed shells from the interior floor portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

DETAILED DESCRIPTION

Figure 1:
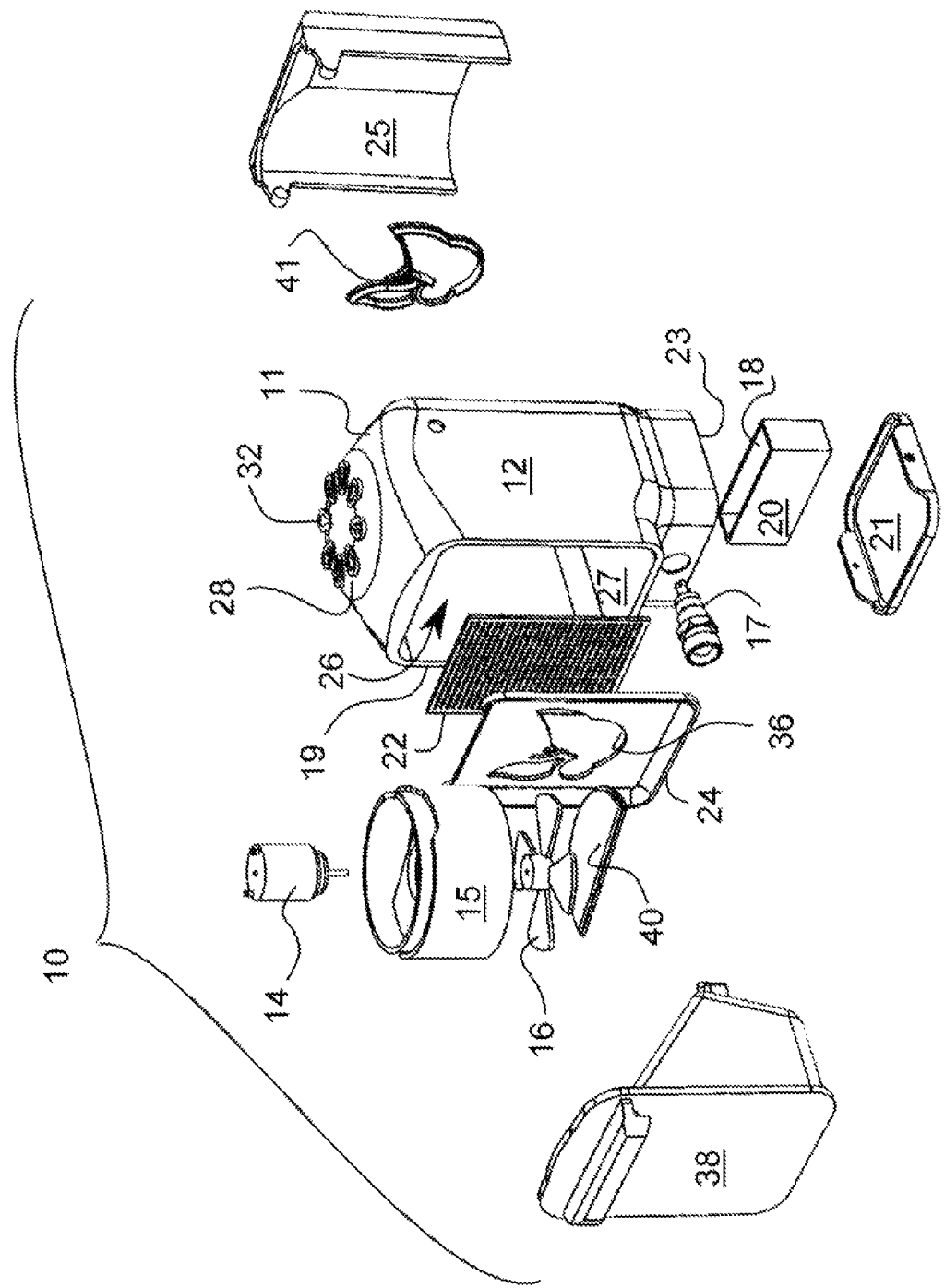
FIG. 1 Exploded view favoring the front.
Figure 2:
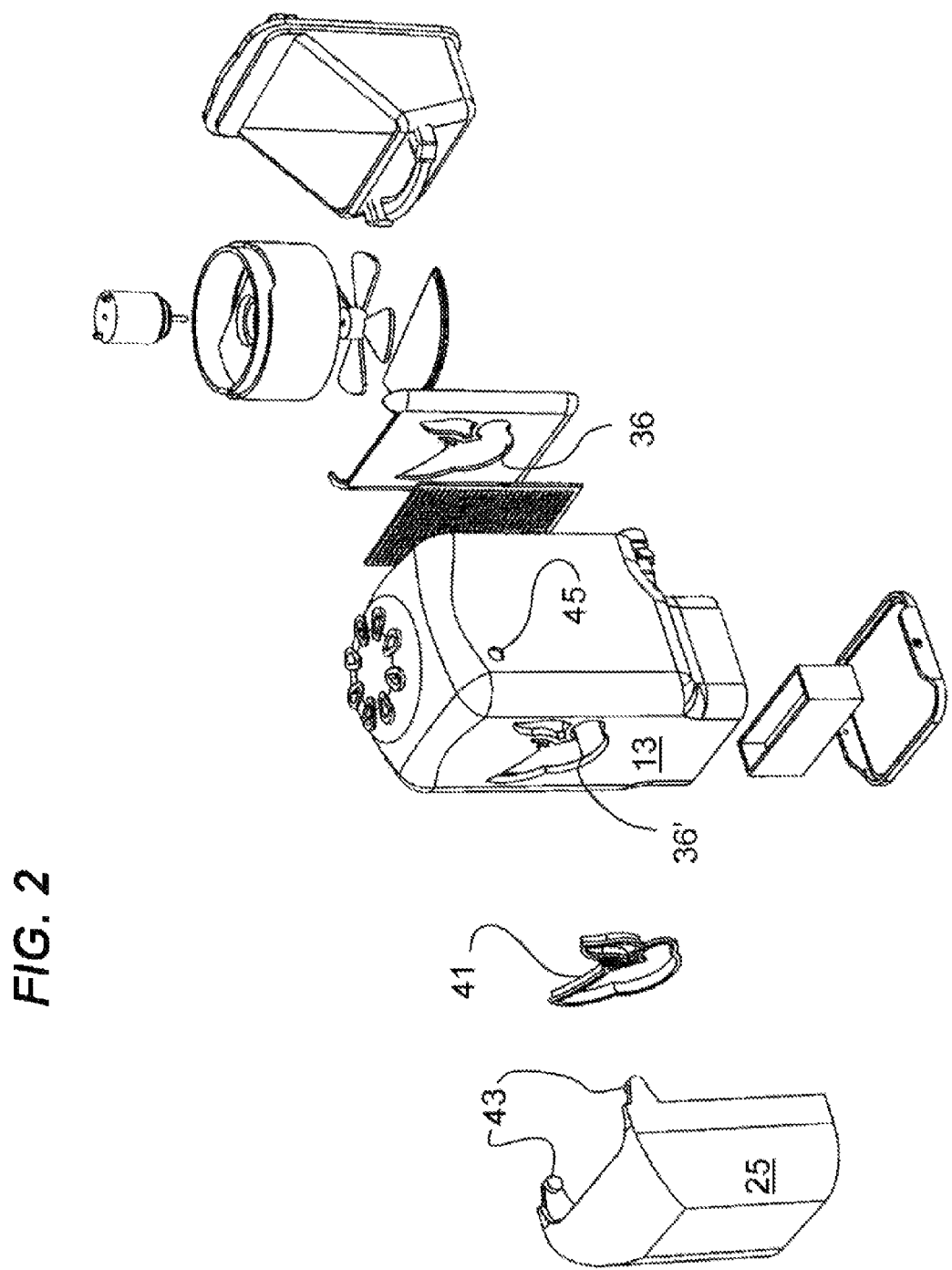
FIG. 2 Exploded view favoring the rear.
Figure 3A:
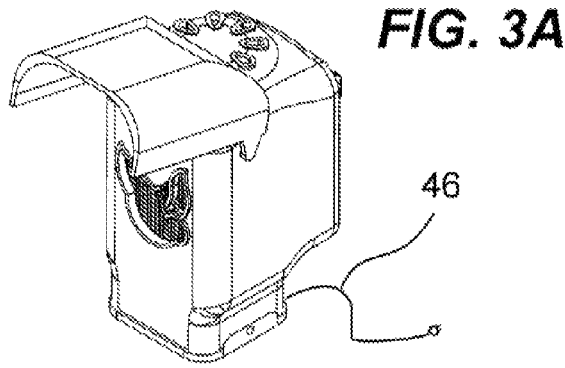
FIGS. 3A-E Isometric, front, rear and side views.
Figure 3B:
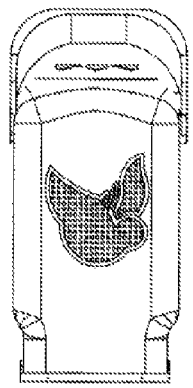
Figure 3C:
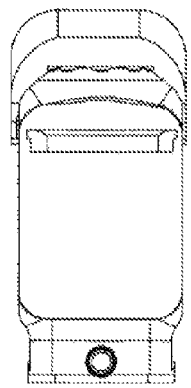
Figure 3D:
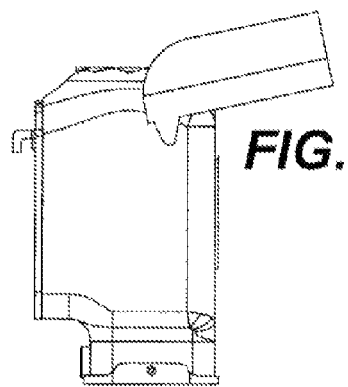
Figure 3E:
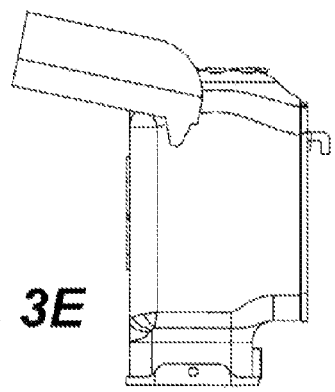
Figure 4A:
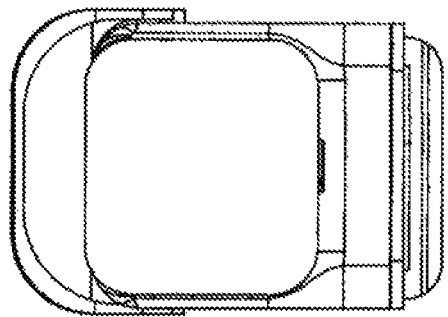
FIGS. 4A-B Bottom and top views.
Figure 4B:
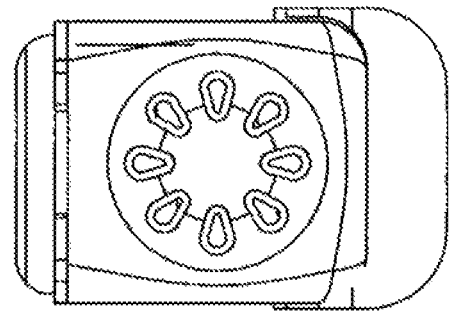

An empty seed shells removing apparatus (10) has a main body (12) comprised of a fan motor (14) connected to a fan assembly comprising a fan member (16), both are connected to a fan motor casing (15) located at the top portion (11) inside the body (12). A battery pack (18) contained in a battery holder (20) and electrically connected to a switch member (17) and the fan motor (14). A battery holder cover (21) to close a battery compartment (23). A mesh member (22) is held in place by a mesh holding frame (24) that is permanently attached inside the body (12).

The top portion (11) of the body (12) has air intake openings (28) covered with decorative intake louvers (32) and a front portion (13) of the body (12) has an air exhaust opening (36') decorated with an exhaust air clip in louver (41). A flip lid (25) rotationally attached to the body (12) by way of dimples (45) receiving pins (43) from the flip lid (25) which covers the exhaust opening (36'). The lid (25) is preferably lowered when the fan assembly (16) operates to prevent the very small particles in the exhausted air from flying everywhere.

A mesh opening (36) within the mesh holding frame (24) is similar in shape to the air exhaust opening (36') so that air can move from inside of the body (12) throughout the mesh (22) and evacuated through the exhaust opening (36') to outside.

In operation, a user takes out a shell container having a bin section (38) from it's original location such as a bird cage, for example, which already contain the mixed full and empty shells, or the bin section (38) can be filled with a mixed full and empty shells from another source. The bin section (38) is then inserted into the back portion (19) of the body (12) by way of the back opening (26). The user then actuates the switch member (17) which runs the fan assembly (16) and gently rocks/shakes the hand held apparatus (10) by hand or other means. It is that movement along with the air stream generated by the fan assembly (16) that separates and removes the lighter empty shells, which fly outside of the bin section (38). The air stream escapes throughout the mesh (22) and the exhaust louver (36') while the empty seeds get trapped off by the mesh (22) and fall onto the floor portion (27) of the device (10). After a small time lapse, the user then presses off the switch member (17) to turn off the fan assembly (16), pulls out the bin section (38), disposes of the empty shells entrapped inside the body (12), then the user can reinstall the empty bin section (38) to the back portion (19) of the body (12) by way of the back opening (26). Or he can refill the bin section (38), and reinstall the bin section (38) back into it's original location such as a bird cage, for example.

While the fan assembly (16) is running, a disc member (40) having a semi-circular shape and located on the underside of the fan motor casing (15) prevents the air stream from going over the empty seeds, and directs all of the air stream towards the bin section (38).

Although described here as a battery operated device (10), it is understood that an alternate embodiment of the device (10) can be operated by way of AC and run from a power outlet.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. For example, an AC motor operating on line current can be substituted to a transformer reduced low voltage DC motor.

The invention claimed is:

1. An empty seed shell removing apparatus for separating and removing empty seed shells from a container having a mixture of full seed shells and empty seed shells, said empty seed shell removing apparatus comprising a main body including an interior, an interior floor portion, a top portion including air intake openings, a front portion having a front opening, and a front portion having an air exhaust opening; a fan assembly attached within said interior of said main body and including a fan member adapted to create an air stream from said air intake openings, around and through said interior, and out through said air exhaust opening, and a shell container sized and shaped to removably slide and fit within said rear opening, said shell container including a bin section adapted to hold said mixture of full seed shells and empty seed shells, wherein when said shell container is full of said mixture of full seed shells and empty seed shells and placed within said main body said fan member is activated creating said air stream from said air intake openings, around and through said interior, and out through said air exhaust opening, such that said air stream circulates through said mixture of full seed shells and empty seed shells causing said empty seed shells to fly out of said bin section while leaving said full seed shells therein, and wherein said empty seed shells end up upon said interior floor portion ready for removal once said fan member is deactivated; said fan assembly includes a fan motor casing for holding said fan motor in place within said main body interior and is attached to an interior surface of said top portion; and wherein said fan motor casing includes a disc member having a semi-circular shape attached to a bottom portion thereof and adapted to prevent said air stream from circulating over said empty seed shells that have accumulated on said interior floor portion.

2. The empty seed shell removing apparatus of claim 1, further comprising mesh member placed against an interior surface of said front portion and adapted to cover said air exhaust opening and filter said airflow therethrough to prevent said empty seed shells from escaping out through said air exhaust opening; and a mesh holding frame having a mesh opening with a similar shape to that of said air exhaust opening, such that said mesh holding frame is secured to said interior surface of said front portion and said mesh opening is aligned with said air exhaust opening.

3. The empty seed shell removing apparatus of claim 2, wherein said main body includes a dimple on two respective opposite exterior sides; and a flip lid includes a receiving pin on respective opposite side portions that are adapted to align and connect with each respective dimple of said main body, to thereby provide said pivotal connection between said flip lid and said main body.

4. The empty seed shell removing apparatus of claim 1, wherein said fan assembly further comprises a direct current motor attached thereto, a battery pack attached to a bottom portion of said main body located under said interior floor portion, and a switch member attached through a rear wall of said bottom portion wherein said battery pack is electrically connected to said switch member which is electrically connected to said direct current motor which is electrically connected to said fan member, such that said fan member can be activated or deactivated by a user controlling said switch member.

5. The empty seed shell removing apparatus of claim 1, wherein said fan assembly further comprises an alternating current motor attached thereto, a switch member attached through a front wall of said bottom portion, and an electric cord adapted to extend between said switch member and an external power source, wherein said switch member is electrically connected to said alternating current motor which is electrically connected to said fan member, such that said fan member can be activated or deactivated by a user controlling said switch member.

6. A method of separating and removing empty seed shells from a container having a mixture of full seed shells and empty seed shells, said method comprising the steps of:
   a. providing an empty seed shell removing apparatus as set forth in claim 4 on a flat and stable surface;
   b. removing said shell container having a mixture of full seed shells and empty seed shells from a given location;
   c. placing said shell container and said mixture into a rear opening of said main body;
   d. using said switch member to activate said fan member;
   e. gently rocking and shaking said apparatus to allow and aid said air stream to circulate within said mixture within said bin section to thereby help separate and remove said empty seed shells from said full seed shells;
   f. placing said apparatus back on said flat and stable surface;
   g. using said switch member to deactivate said fan member;
   h. removing said shell container from said main body and removing and storing said full seed shells;
   i. removing all said empty seed shells from said interior floor portion.

7. The method of separating and removing of claim 6, wherein said fan assembly of said apparatus further comprises a fan motor casing for holding said fan motor in place within said main body interior and is attached to an interior surface of said top portion; and wherein said fan motor casing includes a disc member having a semi-circular shape attached to a bottom portion thereof and adapted to prevent said air stream from circulating over said empty seed shells that have accumulated on said interior floor portion.

8. The method of separating and removing of claim 6, wherein said main body further comprises a mesh member placed against an interior surface of said front portion and adapted to cover said air exhaust opening and filter said airflow therethrough to prevent said empty seed shells from escaping out through said air exhaust opening; and a mesh holding frame having a mesh opening with a similar shape to that of said air exhaust opening, such that said mesh holding frame is secured to said interior surface of said front portion and said mesh opening is aligned with said air exhaust opening.

9. The method of separating and removing of claim 6, wherein said apparatus further comprises a flip lid adapted to be pivotally connected to said main body and removably cover said front portion and air exhaust opening.

10. The method of separating and removing of claim 6, wherein said main body of said apparatus includes a dimple on two respective opposite exterior sides; and said flip lid includes a receiving pin on respective opposite side portions that are adapted to align and connect with each respective dimple of said main body, to thereby provide said pivotal connection between said flip lid and said main body.

11. The method of separating and removing of claim 6, wherein said main body of said apparatus further includes an air exhaust clip in louver adapted to direct said air exhaust opening.

12. The method of separating and removing of claim 6, wherein said fan assembly of said apparatus further comprises an alternating current motor attached thereto, a switch member attached through a front wall of said bottom portion, and an electric cord adapted to extend between said switch member and an external power source, wherein said switch member is electrically connected to said alternating current motor which is electrically connected to said fan member, such that said fan member can be activated or deactivated by a user controlling said switch member.

13. The method of separating and removing of claim 6, wherein each air intake opening of said apparatus includes a plurality of louvers adapted to help direct said air flow through said air intake openings and into said interior of said main body.

* * * * *